(12) United States Patent
Tashiro (10) Patent No.: US 8,416,523 B2
(45) Date of Patent: Apr. 9, 2013

(54) DISK DRIVE DEVICE WITH VERSATILE SHAPED CORE FOR ROTATING A DISK

(75) Inventor: Tomoyuki Tashiro, Nakhonratchasima (TH)

(73) Assignee: Alphana Technology Co., Ltd., Shizuoka (JP)

( * ) Notice: Subject to any disclaimer, the term of this patent is extended or adjusted under 35 U.S.C. 154(b) by 137 days.

(21) Appl. No.: 12/959,999

(22) Filed: Dec. 3, 2010

(65) Prior Publication Data

US 2011/0176240 A1  Jul. 21, 2011

(30) Foreign Application Priority Data

Jan. 19, 2010 (JP) .................................. 2010-008983

(51) Int. Cl.
*G11B 17/02* (2006.01)
*H02K 1/06* (2006.01)

(52) U.S. Cl.
USPC .......................................... 360/99.08; 310/43

(58) Field of Classification Search ............... 360/98.07, 360/99.08; 310/43–45, 67 R, 216.067
See application file for complete search history.

(56) References Cited

U.S. PATENT DOCUMENTS

| | | | | |
|---|---|---|---|---|
| 4,529,900 A | * | 7/1985 | Uzuka | 310/43 |
| 4,858,044 A | * | 8/1989 | Crapo | 360/99.08 |
| 5,291,357 A | * | 3/1994 | Uda | 360/99.08 |
| 5,804,904 A | * | 9/1998 | Park et al. | 310/216.074 |
| 5,866,961 A | * | 2/1999 | Suzuki et al. | 310/67 R |
| 6,563,245 B1 | * | 5/2003 | Suzuki et al. | 310/91 |
| 7,443,071 B2 | * | 10/2008 | Tung et al. | 310/216.067 |
| 7,640,648 B1 | * | 1/2010 | Rittenhouse | 29/596 |

FOREIGN PATENT DOCUMENTS

JP  2007-198555  8/2007

* cited by examiner

*Primary Examiner* — Angel A. Castro
(74) *Attorney, Agent, or Firm* — Fulwider Patton LLP (57) ABSTRACT

A disk drive device comprises a hub on which a magnetic recording disk is to be mounted; a base rotatably supporting the hub through a bearing unit; a sintered core fixed to the base, the sintered core having a ring portion and nine teeth that extend radially from the ring portion; coils wound around nine teeth; and a cylindrical magnet fixed to the hub. The sintered core is formed by heat-treating an iron powder. At least one of (a) the surfaces of particles of the iron powder and (b) the surfaces of the sintered core is insulated.

31 Claims, 6 Drawing Sheets

DISK DRIVE DEVICE WITH VERSATILE SHAPED CORE FOR ROTATING A DISK

CROSS-REFERENCE TO RELATED APPLICATION

This application is based upon and claims the benefit of priority from the prior Japanese Patent Application No. 2010-008983, filed on Jan. 19, 2010, the entire content of which is incorporated herein by reference.

BACKGROUND OF THE INVENTION

1. Field of the Invention

The present invention relates to a disk drive device that rotates a disk.

2. Description of the Related Art

A hard disk drive is known as a medium used as a storage device in a computer. In a hard disk drive, a magnetic recording disk on which recording tracks are formed is rotated at high speed by a brushless motor. A magnetic head is placed against the surface of the magnetic recording disk with a slight distance in between for the purpose of reading/writing magnetic data contained in the recording tracks.

As disclosed in Japanese Patent Application Publication No. 2007-198555, the prior brushless motor has a laminated core as a part of the stator, the core over which wire coils are wound. It is known that this laminated core is formed by laminating a plurality of magnetic steel sheets.

SUMMARY OF THE INVENTION

Under the above circumstances, the inventor of the present invention encountered the following concern: it would be advantageous in designing a thinner, smaller hard disk drive/brushless motor to have a higher degree of freedom for the shape of the core. In case of the laminated core, it is possible to change the planar shape, i.e., the shape of the laminated core when viewed from the top. However, it would be difficult to freely change the three-dimensional shape, including the dimension of height, due to the limitation posed by the manufacturing method in which magnetic steel sheets are laminated. This limitation prevents designing a thinner, smaller disk drive device.

The present invention addresses these disadvantages, and a general purpose of one embodiment of the present invention is to provide a disk drive device that has a core with a higher degree of freedom for its shape.

An embodiment of the present invention relates to a disk drive device. This disk drive device comprises: a hub on which a recording disk is to be mounted; a base rotatably supporting the hub through a bearing unit; a core fixed to the base, the core having a ring portion and a plurality of teeth that extend radially from the ring portion; coils wound around the plurality of teeth; and a plurality of magnetic poles fixed to the hub, the plurality of magnetic poles being arranged to be along the circumferential direction and arranged to radially face the plurality of teeth. The core is formed by heat-treating a magnetic powder. At least one of (a) the surfaces of particles of the magnetic powder and (b) the surfaces of the core is insulated.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

The disk drive device according to the embodiment may preferably be used for the hard disk drive to which a magnetic recording disk is mounted.

In the disk drive device according to the embodiment, the core to be mounted to a stator is formed by heat-treating, sintering, firing, or burning a magnetic powder. This may increase the degree of freedom of the shape of the core. In particular, it may become possible to form the core so that it is suitable for the thinning of the disk drive device.

Figure 1A:
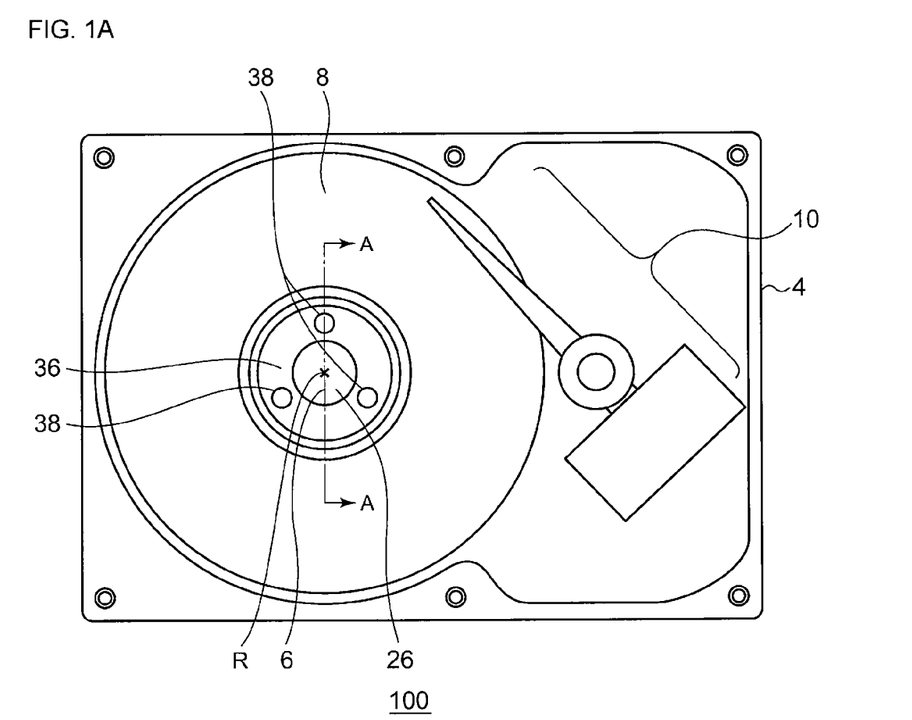
FIG. 1A is a top view of the disk drive device according to the embodiment of the present invention.
Figure 1B:
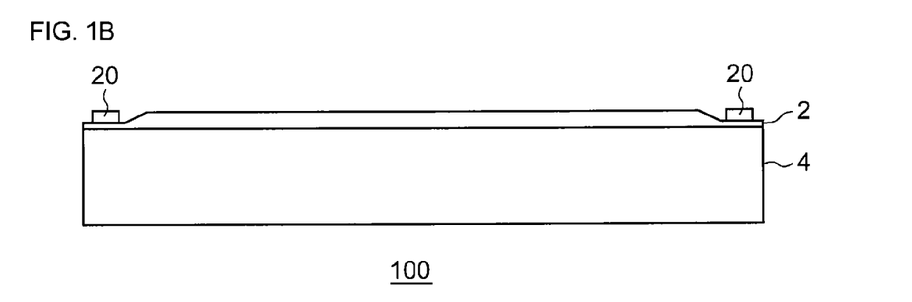
FIG. 1B is a side view of the disk drive device according to the embodiment of the present invention.

FIG. 1A is a top view of the disk drive device 100 according to the embodiment. FIG. 1B is a side view of the disk drive device 100 according to the embodiment. In FIG. 1A, the disk drive device 100 is shown without a top cover 2 in order to show the inside of the disk drive device 100. The disk drive device 100 comprises: a base 4; a rotor 6. The disk drive device 100 may comprise: a magnetic recording disk 8; a data read/write unit 10; and the top cover 2.

Hereinafter, it is assumed that the side of the base 4 on which the rotor 6 is installed is the "upper" side.

The magnetic recording disk 8 of 2.5-inch type is mounted on the rotor 6, and rotates with the rotor 6. The rotor 6 is rotatably mounted to the base 4 through the bearing unit 12, which is not shown in FIG. 1A. The base 4 is produced by die-casting an alloy of aluminum. FIG. 1B is a side view of the disk drive device 100 according to the embodiment. The top cover 2 is fixed to the base 4 using six screws 20.

Figure 2:
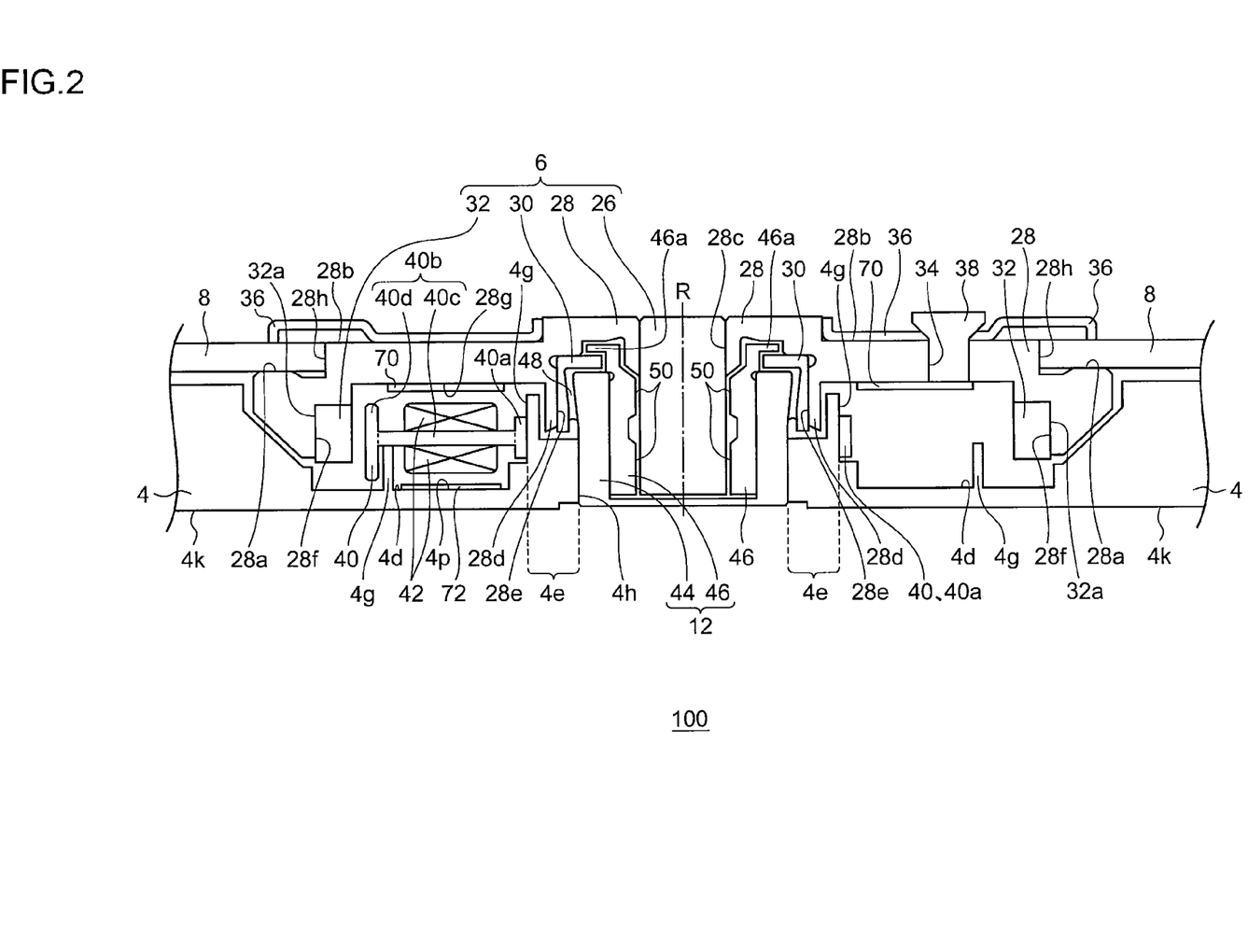
FIG. 2 is a view that is sectioned along the line A-A, as illustrated in FIG. 1A.

FIG. 2 is a view that is sectioned along the line A-A, as illustrated in FIG. 1A. The rotor 6 includes: the shaft 26; the hub 28; the flange 30; and a cylindrical magnet 32. The magnetic recording disk 8 is mounted on a disk-mount surface 28a of the hub 28. Three screw holes 34 for affixing a disk are arranged on the upper surface 28b of the hub 28 at 120-degree intervals around the rotational axis R of the rotor 6. The damper 36 is pressed against the upper surface 28b of the hub 28 by three screws 38 for affixing a disk, which are screwed in the corresponding three screw holes 34 for affixing a disk. The clamper 36 presses the magnetic recording disk 8 against the disk-mount surface 28a of the hub 28.

The hub 28 is made of soft-magnetic steel such as SUS430F. The hub 28 is formed to be predetermined cup-like shape by, for example, the press working or cutting of a steel plate. For example, the hub 28 may preferably be made of the stainless steel (DHS1) provided by Daido Steel Co., Ltd., since the stainless steel has lower outgas and is easily-worked. The hub 28 may more preferably be made of the stainless steel (DHS2) provided by Daido Steel Co., Ltd., since the stainless steel further has high corrosion resistance.

The hub 28 includes an outer cylindrical surface 28h that is to meet the central hole of the magnetic recording disk 8; and an inner cylindrical surface 28f to which an outer surface 32a of the cylindrical magnet 32 is fixed. The outer cylindrical surface 28h and the inner cylindrical surface 28f are formed separately in the direction along the rotational axis R. This structure may reduce the leaking of flux into the side of the magnetic recording disk 8. The hub 28 is formed so that the diameter of the inner cylindrical surface 28f is greater than the diameter of the outer cylindrical surface 28h. This may make it possible to adopt a larger cylindrical magnet, in particular, a cylindrical magnet that has a larger maximum energy product, as the cylindrical magnet 32.

The shaft 26 is fixed in the hole 28c arranged at the center of the hub 28 by using both press-fitting and glue, the hole 28c being arranged coaxially with the rotational axis R of the rotor 6. The flange 30 is in ring-shape and has a reverse L-shaped cross section. The flange 30 is glued on an inner surface 28e of a hanging portion 28d of the hub 28.

The cylindrical magnet 32 is glued on the inner cylindrical surface 28f of the hub 28. The cylindrical magnet 32 is made of a rare-earth material such as Neodymium, Iron, or Boron. The cylindrical magnet 32 faces radially towards nine teeth of the sintered core 40. The cylindrical magnet 32 is magnetized for driving, with twelve poles along the circumferential direction. The surface of the cylindrical magnet 32 is treated for preventing rusting by electro deposition coating or spray coating.

The bearing hole 4h, the center of which is along the rotational axis R of the rotor 6, is formed on the base 4. The bearing unit 12 includes the housing 44 and the sleeve 46 and rotatably supports the rotor 6 with respect to the base 4. The housing 44 is glued in the bearing hole 4h of the base 4. The housing 44 is formed to be cup-shaped by integrating a cylindrical portion and a bottom portion as a single unit. The housing 44 is glued to the base 4 with the bottom portion downside. The cylindrical sleeve 46 is glued on the inner side surface of the housing 44. A jetty portion 46a, which radially juts out, is formed at the upper end of the sleeve 46. This jetty portion 46a, in cooperation with the flange 30, limits the motion of the rotor 6 in the direction along the rotational axis R of the rotor 6.

The sleeve 46 accommodates the shaft 26. The lubricant 48 is injected into a region in between part of the rotor (the shaft 26, the flange 30, and the hub 28) and the bearing unit 12.

A pair of herringbone-shaped radial dynamic pressure grooves 50, which are vertically separated from each other, are formed on the inner surface of the sleeve 46. A first herringbone-shaped thrust dynamic pressure groove (not shown) is formed on the lower surface of the flange 30 that faces the upper surface of the housing 44. A second herringbone-shaped thrust dynamic pressure groove (not shown) is formed on the upper surface of the flange 30 that faces the lower surface of the jetty portion 46a. The rotor 6 is axially and radially supported by the dynamic pressure generated in the lubricant 48 by these dynamic pressure grooves when the rotor 6 rotates.

The pair of herringbone-shaped radial dynamic pressure grooves may be formed on the shaft 26. The first thrust dynamic pressure groove can be formed on the upper surface of the housing 44, and the second thrust dynamic pressure groove may be formed on the lower surface of the jetty portion 46a.

The disk drive device 100 further comprises, as stator parts that are fixed to the base 4, a sintered core 40 and coils 42. The sintered core 40 has a ring portion 40a and nine teeth 40b, which extend radially outward from the ring portion 40a, and is fixed on the upper surface 4d side of the base 4. Each of the nine teeth 40b has a middle portion 40c that extends radially outward from the ring portion 40a and around which the corresponding coil 42 is wound; and an end portion 40d being arranged at the opposite side of the middle portion 40c from the ring portion 40a. The sintered core 40 is formed by heat-treating or sintering a magnetic powder such as an iron powder. The sintered core 40 will be described in more detail below.

Each of the coils 42 is wound around one of the nine teeth 40b, respectively. A driving flux is generated along the teeth 40b by applying a three-phase sinusoidal driving current through the coils 42. A ring-shaped wall 4e, the center of which being along the rotational axis R of the rotor 6, is formed on the upper surface 4d of the base 4. The sintered core 40 is fitted to the outer surface 4g of the ring-shaped wall 4e with a press-fit or clearance fit and glued thereon.

The method for manufacturing the sintered core 40 will be described below: a material that has a higher saturation magnetic flux density such as an iron powder manufactured by powderizing a high purity (99.9 percent) iron is used for the raw material of the sintered core 40. The surfaces of particles of the iron powder are insulated. In particular, the surfaces are treated so that insulation films are formed on the surfaces. An epoxide-based binder is mixed with the insulated iron powder. The result is compression-molded in a metallic mold and heat-treated or sintered for two hours at 530~550 degrees Celsius. This heat-treating temperature can be selected from the range of 300 to 800 degrees Celsius so that desired mechanical and magnetic characteristics can be obtained. In particular, parameters including this heat-treating temperature and the heat-treating time period can be selected according to experiment. Afterward burrs at an edge portion are removed by barrel polishing of rotation type or vibration type. The result is washed with pure water and dried.

In the next step, the surfaces of the sintered core 40 are insulated. More specifically, one surface of the core produced as above is coated with an epoxy resin by, for example, spray coating. The result is, for example, heat-treated or cured for 30 minutes at 200 Celsius degrees. Another surface of the core also is coated with an epoxy resin by, for example, spray coating. The result is, for example, heat-treated or cured for 30 minutes at 200 Celsius degrees. Afterward quality inspection such as dimension inspection or appearance inspection is performed.

Atomization, mechanical comminution, electrolysis, thermal treatment, chemical reduction, plasma rotating electrode process, uniform droplet spray, or the modification thereof can be used as a method for producing the iron powder. Coating with an epoxy resin, for example, can be used as a method for forming insulation films in the insulation process. A method can be used as a method for forming insulation films in the insulation process, including the steps of: (a) mixing/spraying a silicon resin dissolved in an organic solvent with/to an iron powder; and (b) drying the result afterwards to remove the organic solvent.

In the process of producing the iron powder, the iron powder is produced so that the average particle diameter of the iron powder is in the range of 0.05 mm to 0.5 mm. It is preferable to make the average particle diameter of particles of magnetic metal such as iron greater than or equal to 0.05 mm since coercivity can be reduced. It is preferable to make the average particle diameter less than or equal to 0.5 mm since the loss due to eddy current can be reduced.

As is mentioned above, the surfaces of particles of the iron powder is insulated. This is to reduce the loss due to eddy current, the eddy current being generated in the sintered core 40 by applying current through the coils 42. In general, there is a tendency that the loss due to the eddy current becomes less as the electric resistivity of the sintered core 40 becomes higher. In the present embodiment, by insulating the surfaces of particles of the iron powder, the electric resistivity of the sintered core 40 is increased while keeping the soft magnetic property of the sintered core 40. By doing so, the loss due to the eddy current is reduced.

The average thickness of these insulation films is in the range of 10 nm to 1 μm. It is preferable to make the average thickness of these insulation films greater than or equal to 10 nm since the loss due to the eddy current can effectively be reduced. In addition, it is unlikely for these insulation films to be sheared and destroyed when compression-molding. In the case where the average thickness of the insulation films is less than or equal to 1 μm, the ratio of the insulation films to the soft-magnetic material may not be so large. This may prevent the magnetic flux density of the sintered core 40 generated by compression-molding the soft-magnetic material from decreasing.

A binder is mixed with the insulated iron powder. An epoxide-based binder, for example, may be mixed. The iron powder with which the binder has been mixed is compression-molded in a metallic mold. If the result is heat-treated or sintered with rather a high heat-treating temperature and/or for rather a long heat-treating time period, the insulation films may deteriorate and the electric resistivity inside the sintered core 40 may decrease. Then, the loss due to eddy current may increase. Therefore, in the heat-treating process or the sintering process, the heat-treating temperature (i.e., the temperature to which the object is heated in the heat-treating process or the sintering process) and the heat-treating time period (i.e., the time period for which the object is kept heated in the heat-treating process or the sintering process) may be adjusted so that the amount of the driving current necessary for driving the disk drive device 100 becomes lower than a predetermined reference value.

Figure 3:
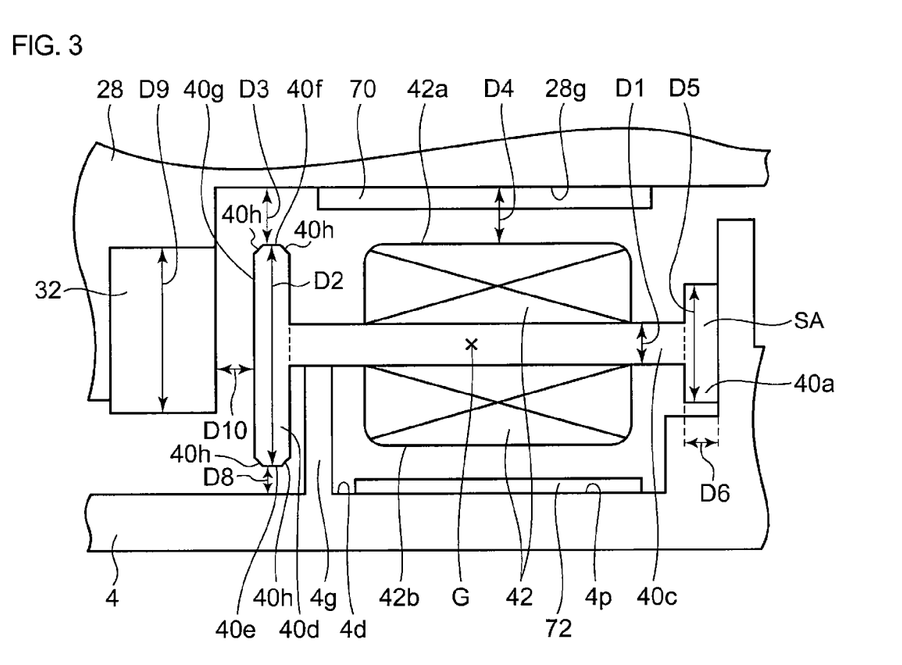
FIG. 3 is a magnified sectional view that magnifies the vicinity of the teeth as illustrated in FIG. 2.
Figure 4:
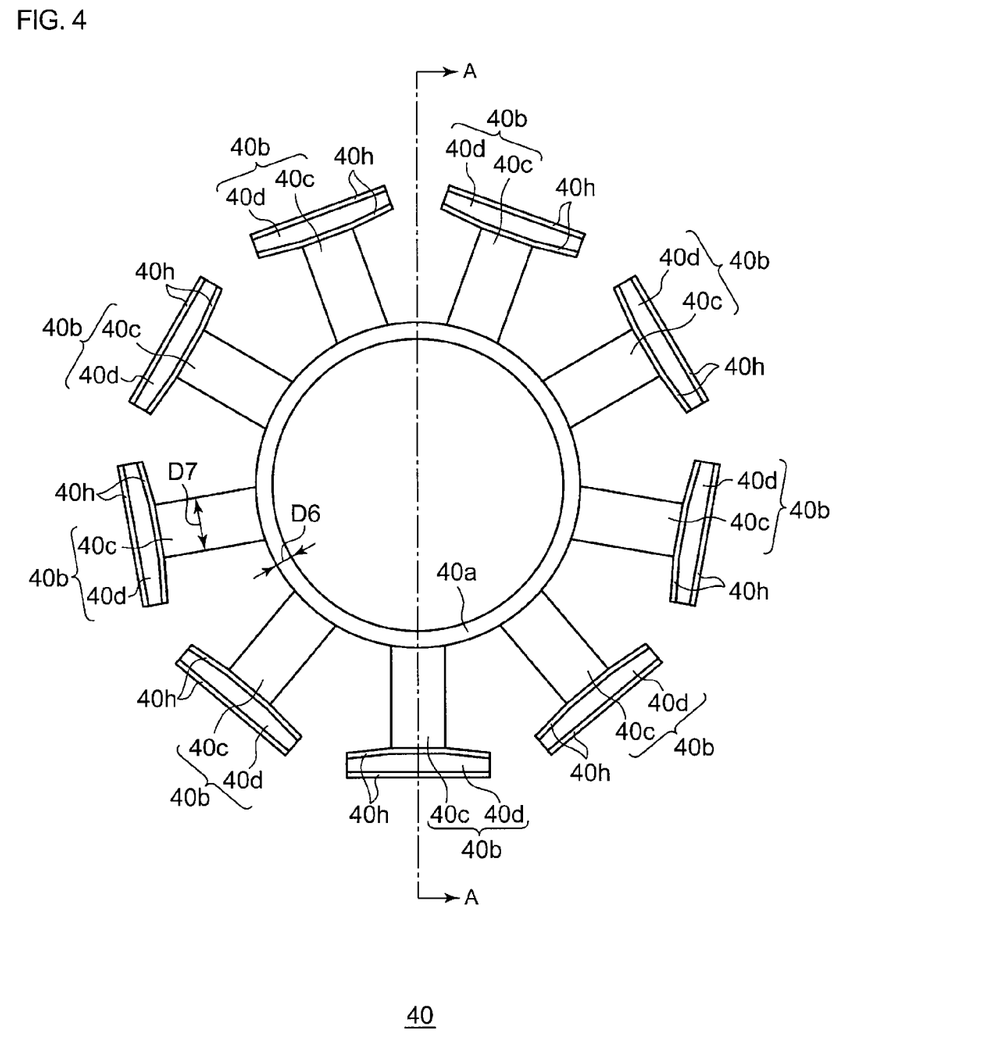
FIG. 4 is a top view of the sintered core as illustrated in FIG. 2.

In the present embodiment, the fact that the core is made by heat-treating or sintering increases the degree of freedom of the shape of the core. In particular, the shape of the sintered core 40 with regard to the height may be changed. FIG. 3 is a magnified sectional view that magnifies the vicinity of the teeth 40b as illustrated in FIG. 2. FIG. 4 is a top view of the sintered core 40 as illustrated in FIG. 2.

Both the middle portion 40c and the end portion 40d of the sintered core 40 have substantially rectangular cross sections as viewed in the radial direction. The sintered core 40 is formed so that the cross section of the end portion 40d viewed in the radial direction is greater than the cross section of the middle portion 40c viewed in the radial direction. In particular, the sintered core 40 is formed so that the dimension or the height D1 of the middle portion 40c in the direction along the rotational axis R is less than the height D2 of the end portion 40d.

In this case, the middle portion 40c can be made smaller while keeping the area of an end surface 40g large, the end surface 40g being a surface of the end portion 40d that faces the cylindrical magnet 32. Therefore, the number of turns of the coil 42 that is wound around the middle portion 40c can be increased while keeping the area of the end surface 40g large, the end surface 40g being the surface into which a flux from the cylindrical magnet 32 enters. As a result, the torque may be increased. Accordingly, if the thickness of the disk drive device 100 is defined, the torque can be increased to stabilize the rotation. If the required torque is defined, the sintered core 40 can be made thinner; thereby the disk drive device 100 can be made thinner.

The sintered core 40 is formed so that the height D5 of the ring portion 40a is greater than the height D1 of the middle portion 40c. In this case, as is described above, the number of turns of the coil 42 that is wound around the middle portion 40c can be increased.

A flux generated in the middle portion 40c by applying a current through the coil 42 is divided into two halves when entering into the ring portion 40a, one of the two halves flowing clockwise in FIG. 4 and the other of the two halves flowing counterclockwise in FIG. 4. Therefore, in order not to increase the magneto-resistance at the ring portion 40a, the cross sectional area SA of the ring portion 40a as viewed in the circumferential direction (i.e., the cross sectional area SA shown in FIG. 3) should be made greater than 50 percent of the cross sectional area of middle portion 40c viewed in the radial direction. In the prior art disk drive device that uses a laminated core, there is no degree of freedom with regard to the height and, in general, the height of the teeth is the same as the height of the ring portion. Therefore, in order to satisfy the above condition, it has been common to design so that the thickness of the ring portion along the radial direction is greater than 50 percent of the width of the teeth along the circumferential direction.

However, in the disk drive device 100 according to the present embodiment, it is possible to make the height D5 of the ring portion 40a greater than the height D1 of the middle portion 40c. Therefore, the above-mentioned limitation to the thickness D6 of the ring portion 40a along the radial direction is relaxed.

In particular, the sintered core 40 is formed so that the thickness D6 of the ring portion 40a is less than or equal to 40 percent of the width D7 of the middle portion 40c along the circumferential direction. This is realized by, for example, making the height D5 of the ring portion 40a greater than or equal to 125 percent of the height D1 of the middle portion 40c. In this case, if the overall dimension of the sintered core 40 is defined, the teeth 40b can be made longer by the amount corresponding to the decrease of the thickness D6 of the ring portion 40a. Accordingly, the number of turns of the coil 42 can be increased. As a result, the torque can be increased to stabilize the rotation.

In an exemplary design of the disk drive device 100, the distance D3, in the direction along the rotational axis R, between the end portion 40d and the hub 28 is set to be as small as possible. Then, the coils 42 are wound so that the distance D4, in the direction along the rotational axis R, between the coils 42 and the hub 28 is greater than the distance D3 between the end portion 40d and the hub 28. In other words, when the tooth 40b is viewed in the radial direction, the coil 42 is wound so that the coil 42 does not go out of the end portion 40d in the direction along the rotational axis R. When the coil 42 is wound as much as possible in order to increase the torque, the distance D3 between the end portion 40d and the hub 28 is substantially equal to the distance D4 between the coil 42 and the hub 28.

In this case, a reference that shows the maximum number of turns of the coil 42 can be obtained. Therefore, the distance between the sintered core 40 and the hub 28 can be reduced; thereby, the disk drive device 100 can be made thinner. At the same time, it is possible to reduce the possibility of the coils 42 touching the hub 28 due to, for example, manufacturing errors of the coils 42; thereby, the yield can be boosted.

Due to the requirement that the disk drive device 100 should be made thinner, both the distance D4 between the coils 42 and the hub 28 and the distance between the coils 42 and the base 4 are made small. Therefore, there is a possibility that a part of the coils 42 touches the hub 28 or the base 4 due to deterioration with age or vibration. It is more harmful for the coils 42 to touch the hub 28 than for the coils 42 to touch the base 4 because the hub 28 rotates with respect to the coils 42. This is because the insulation of the coils 42 may be destroyed or the wire of the coils 42 may break by rubbing the coils 42 with the hub 28. Therefore, in the disk drive device 100 according to the present embodiment, the disk drive device 100 is designed so that the distance D3 between the end portion 40d and the hub 28 is greater than the distance D8, in the direction along the rotational axis R, between the end portion 40d and the base 4. This may reduce the probability of the more harmful case in which the coils 42 touch the hub 28, relative to the probability of the case in which the coils 42 touch the base 4.

In order to reduce the probability of the coils 42 touching the hub 28, the surfaces 42a of the coils 42 that face the hub 28 are made flat. In order to make the surfaces 42a of the coils 42 flat, the coils 42 are pressed in the direction along the rotational axis R. In this case, the flattening of the wire that forms the flattened coil 42 may be less than or equal to 90 percent. Here, the flattening of the wire is the representation on percentage of the ratio of the minor diameter to the major diameter of the cross section of the wire, the cross section of the wire being made elliptical due to the press. In particular, the flattening of the wire is defined as a flattening of a portion of the wire of the coil 42, the portion giving the minimum of the ratio. The equation that shows the flattening of the wire is given below:

(flattening)=(minor diameter/major diameter)×100(%)

In the case where the flattening of the wire is less than or equal to 90 percent, it is noted that the flattening of the portion of the wire is less than or equal to 90 percent, the portion corresponding to the portion of the coil that had been the thickest in the direction along the rotational axis R before pressing the coil.

Accordingly, it is recognizable whether the surfaces 42a of the coils 42 that face the hub 28 are made flat or not by measuring the flattening of the wire.

The surfaces 42b of the coils 42 that face the base 4 may be made flat. In this case, the probability of the coils 42 touching the base 4 can be reduced.

To cope with the probability of the coils 42 touching the hub 28, the surface 28g of the hub 28 that faces the coils 42 is insulated. This can reduce the probability of a short-circuit between the coils 42 and the hub 28. For example, a ring-shaped insulation film 70 made of polyethylene terephthalate (PET) is attached, with a double-faced adhesive tape, to the surface 28g of the hub 28 that faces the coils 42. In this case, the work may be made easier.

Similarly, with regard to the base 4 side, the surface 4p of the base 4 that faces the coils 42 is insulated. This may reduce the probability of short-circuit between the coils 42 and the base 4. For example, an insulation layer 72 is deposited to the surface 4p of the base 4, which faces the coils 42, by electro deposition coating. This is preferable due to less numbers of pinholes. An insulation film similar to the insulation film 70 may be attached to the surface 4p of the base 4 that faces the coils 42. This is preferable because the work may be made easier.

The sintered core 40 is formed so that the sintered core 40 is asymmetric with respect to a surface perpendicular to the rotational axis R, the surface including a center G of gravity of the middle portion 40c. For example, the sintered core 40 can be formed so that one of the two parts of the end portion 40d is shorter than the other. The two parts include: a part protruding on the hub 28 side when viewed from the middle portion 40c; and a part protruding on the base 4 side. This is advantageous because the weight of the sintered core 40 can be reduced. In the case where the tooth 40b has a reverse L-shaped cross section or where either first end portion 40f or the second end portion 40e of the end portion 40d is omitted, the fraying of the coils 42 wound around the middle portion 40c can generally be prevented if the height D2 of the end portion 40d is sufficiently long.

Since the positions, in the direction along the rotational axis R, of the middle portion 40c and the end portion 40d can individually be determined in the sintered core 40 as described above, each of the middle portion 40c and the end portion 40d can be arranged at a corresponding position best suited in design. For example, the sintered core 40 may be formed so that the center G of gravity of the middle portion 40c is closer to the second end portion 40e on the base 4 side of the end portion 40d than to the first end portion 40f on the hub 28 side of the end portion 40d.

Figure 5:
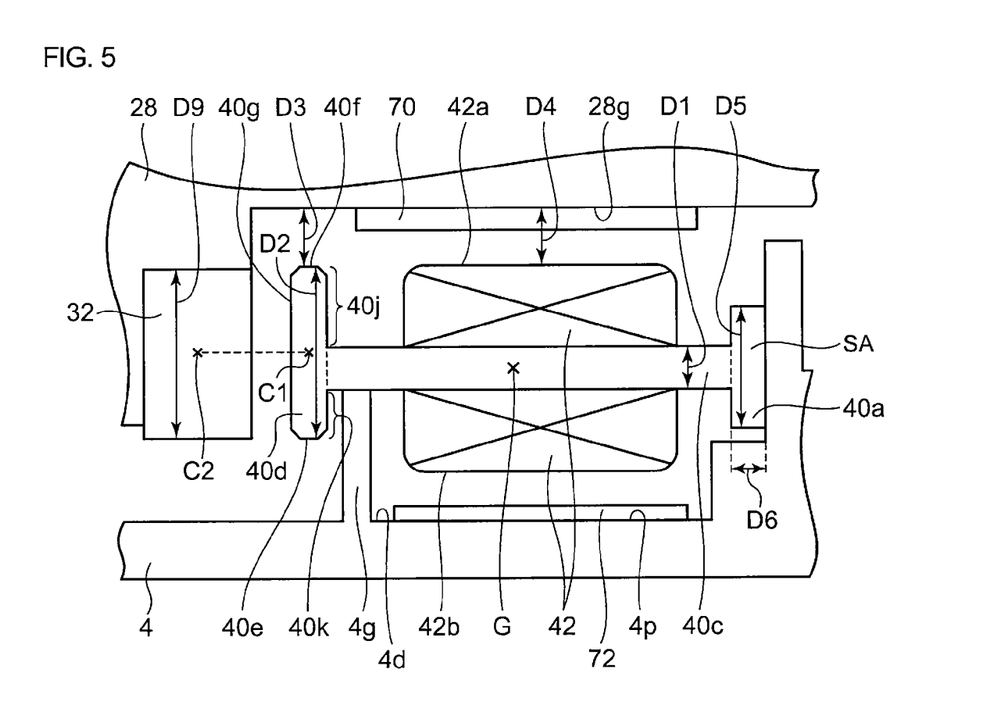
FIG. 5 is a magnified sectional view that magnifies the vicinity of the teeth according to another embodiment.

FIG. 5 is a magnified sectional view that magnifies the vicinity of the teeth 40b according to another embodiment. The center G of gravity of the middle portion 40c is closer to the base 4 than the center C1, in the direction along the rotational axis R, of the end portion 40d. The height D2 of the end portion 40d is substantially equal to the height D9 of the cylindrical magnet 32 in the direction along the rotational axis R. Therefore, the center C1 of the end portion 40d is aligned with the center C2 of the cylindrical magnet 32 in the direction along the rotational axis R. With regard to the end portion 40d, the portion 40k that protrudes on the base 4 side when viewed from the middle portion 40c is shorter, in the direction along the rotational axis R, than the portion 40j that protrudes on the hub 28 side.

In this case, the center of the end portion 40d can be arranged closer, in the direction along the rotational axis R, to the magnetic center of the cylindrical magnet 32. This may reduce the magnetoresistance. The distance between the middle portion 40c and the hub 28 increases; thereby, the number of turns of the coil 42 may relatively increase. As a result, if the thickness of the disk drive device 100 is defined, the torque can be increased to stabilize the rotation. If the required torque is defined, the sintered core 40 can be made thinner; thereby, the disk drive device 100 can be made thinner.

The sintered core 40 may be formed so that the center G of gravity of the middle portion 40c is closer to the first end portion 40f on the hub 28 side of the end portion 40d than to the second end portion 40e on the base 4 side of the end portion 40d. By doing so, the center of the cylindrical magnet 32 can be displaced, in the direction along the rotational axis R, with respect to the center of the end portion 40d. As a result, the magnetic suction force applied between the cylindrical magnet 32 and the end portion 40d has a component in the direction along the rotational axis R. According to this component, the vibration of the hub 28 in the direction along the rotational axis R can be suppressed.

Now referring to FIG. 3 and FIG. 4, the height D2 of the end portion 40d is in the range of 110 percent to 140 percent of the height D9 of the cylindrical magnet 32 in the direction along the rotational axis R. It is preferable to make the height D2 of the end portion 40d greater than or equal to 110 percent of the height D9 of the cylindrical magnet 32 because the end portion 40d can capture a large portion of the flux from the cylindrical magnet 32 so that the leakage of the flux from the cylindrical magnet 32 can be reduced. The effect of capturing the flux from the cylindrical magnet 32 in the case where the height D2 of the end portion 40d is made greater than 140 percent of the height D9 of the cylindrical magnet 32 may rarely be stronger than the case of 140 percent. It is preferable to make the height D2 of the end portion 40d less than or equal to 140 percent of the height D9 of the cylindrical magnet 32 because the effect of capturing the flux from the cylindrical magnet 32 can sufficiently be maintained while suppressing the increase of the thickness of the disk drive device 100.

A chamfer portion 40h is arranged by chamfering the corners of the end portion 40d along the rotational axis R. For example, this may reduce the probability that the end portion 40d may catch a glove and that the glove is torn when moving the sintered core 40 by hand. Accordingly, safer transport may be realized. As a result, the working speed may increase.

The sintered core 40 is supported by the base 4 at both the side closer to the ring portion 40a and the side closer to the end portion 40d. The sintered core 40 is supported at the side closer to the ring portion 40a by fixing the ring portion 40a to the base 4. The sintered core 40 is supported at the side closer to the end portion 40d by seating a part of the middle portion 40c, which is sandwiched between the coil 42 and the end portion 40d, onto a core-supporting portion 4q arranged on the base 4. Since the sintered core 40 is supported at both the inner side and the outer side, the probability that the sintered core 40 is mounted inclined to the rotational axis R may be reduced.

The core-supporting portion 4q has a ring-shape and protrudes from the upper surface 4d of the base 4. The core-supporting portion 4q may be formed as a single unit with the base 4 or may be formed separately. The former case may reduce the number of assembling steps. The latter case may make it possible to produce the core-supporting portion 4q out of a material different from the base 4, such as plastic.

The operation of the disk drive device 100 as described above shall be described below. The three-phase driving current is supplied to the coils 42 to rotate the magnetic recording disk 8. The fluxes are generated along the nine teeth 40b by making the driving current flow through the coils 42. The interaction between these fluxes and the driving flux of the cylindrical magnet 32 generates torque, and the rotor 6 and the magnetic recording disk 8, which is fitted to the rotor 6, rotate.

In the disk drive device 100 according to the present embodiment, the sintered core 40 is formed by heat-treating or sintering the iron powder. Therefore, the degree of freedom of the shape of the sintered core 40 is greater than that of the laminated core, and the sintered core 40 can be formed so that the sintered core 40 is more suitable for thinning and miniaturizing the disk drive device 100. In addition, since extra portions of the sintered core 40 can be removed, the weight of the disk drive device 100 may be reduced. Also in addition, the shape of the sintered core 40 can be formed by, for example, a metallic mold. This is favorable for mass production, and the cost may be reduced.

Above is an explanation based on the exemplary embodiment. This embodiment is intended to be illustrative only, and it will be obvious to those skilled in the art that various modifications to constituting elements and processes could be developed and that such modifications are also within the scope of the present invention.

The embodiment describes a so-called, outer-rotor type of the disk drive device 100 in which the cylindrical magnet 32 is located outside the sintered core 40. However, the present invention is not limited to this. For example, the present invention may be applied to a so-called, inner-rotor type of the disk drive device in which the cylindrical magnet is located inside the sintered core.

The embodiment describes the case where the bearing unit 12 is fixed to the base 4, and the shaft 26 rotates with respect to the bearing unit 12. However, the present invention is not limited to this. For example, the present invention may be applied to a shaft-fixed type of the disk drive device in which the shaft is fixed to the base, and the bearing unit and the hub rotate together with respect to the shaft.

The embodiment describes the case where the bearing unit 12 is directly mounted to the base 4. However, the present invention is not limited to this. For example, a brushless motor having a rotor; a bearing unit; a sintered core; coils; and base can be manufactured separately, and the manufactured brushless motor can be installed on the chassis of a hard disk drive.

The embodiment describes the case where the magnetic recording disk 8 of 2.5-inch type is mounted on the hub 28. However, the present invention is not limited to this. For example, a magnetic recording disk whose central hole has about 20 mm diameter may be mounted on the hub. The thickness of the disk drive device in the direction along the rotational axis may be made less than or equal to 7.5 mm. In other words, by applying the technical aspects of the embodiment, a small, thin, light, and reliable disk drive device such as this can be realized. In addition, the embodiment contributes to resource-saving.

The embodiment describes the case where the surfaces of particles of the iron powder are insulated. However, the present invention is not limited to this. For example, the surfaces of particles of a magnetic powder may be treated so that the electric resistivity of the surfaces is higher than that of the inside of the particles.

The invention described in the embodiment may be expressed as follows:

A method for manufacturing a core of a disk drive device, including the steps of:

treating the surfaces of particles of a magnetic powder so that the electric resistivity of the surfaces is higher than that of the inside of the particles;

molding the treated magnetic powder into a shape of the core; and heat-treating or sintering the molded magnetic powder.

Figure 6A:
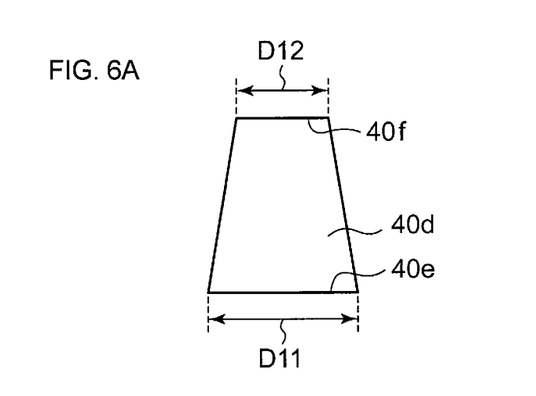
FIG. 6A is a front view of the end portion viewed in the radial direction.
Figure 6B:
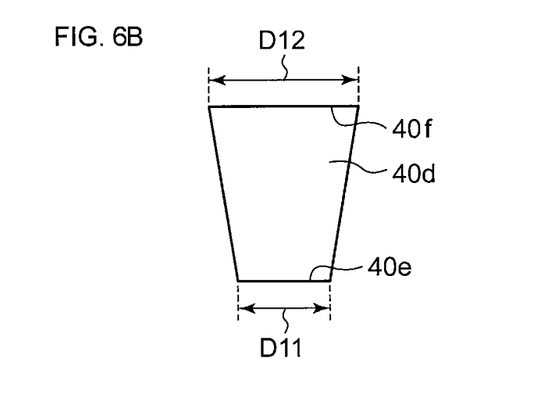
FIG. 6B is a front view of the end portion viewed in the radial direction.

With regard to the shape of the end portion 40d in the embodiment, the width D11, along the circumferential direction, of the second end portion 40e arranged on the base 4 side of the end portion 40d may be different from the width D12, along the circumferential direction, of the first end portion 40f arranged on the hub 28 side of the end portion 40d. FIG. 6A and FIG. 6B are front views of the end portion 40d viewed in the radial direction. In FIGS. 6A and 6B, the chamfer portion 40h is omitted. FIG. 6A shows the case where D11>D12, and FIG. 6B shows the case where D11<D12. In the former case, the cylindrical magnet 32 applies a pull-down force to the end portion 40d. Therefore, if the floating force of the rotor 6 is large, the pull-down force may balance with the floating force to realize a stable rotation. In the latter case, the cylindrical magnet 32 applies a pull-up force to the end portion 40d.

Therefore, if the floating force of the rotor 6 is small, the pull-up force may support the floating of the rotor 6 to realize a stable rotation.

The distance D10 between the cylindrical magnet 32 and the end surface 40g of the end portion 40d in the embodiment may be in the range of 0.2 mm to 0.4 mm. It is preferred to make this distance less than or equal to 0.4 mm because large torque can be obtained. It is preferred to make this distance greater than or equal to 0.2 mm in light of the contact between the cylindrical magnet 32 and the end portion 40d.

The maximum energy product of the cylindrical magnet 32 in the embodiment may be in the range of 10 MGOe (Mega Gauss Oersted) to 16 MGOe. This range of the maximum energy product may provide both an easy magnetization of the cylindrical magnet 32 and an improvement in the driving characteristic. The combination of the cylindrical magnet 32 with this maximum energy product and a back yoke with 1 T of saturation magnetic flux density may reduce a leakage of a flux in a thinned disk drive device.

The embodiment describes the case where both the middle portion 40c and the end portion 40d of the sintered core 40 have substantially rectangular cross sections as viewed in the radial direction. However, the present invention is not limited to this. For example, the corners of the cross section of the middle portion 40c viewed from the radial direction may be smooth curves such as arcs. In this case, the probability that a short circuit happens because the coil 42 is damaged at the corners may be reduced. In addition, the length of the coil may be shortened and the coil resistance may decrease.

The embodiment describes the case where the disk drive device 100 comprises the cylindrical magnet 32. However, the present invention is not limited to this. The disk drive device may comprise a plurality of magnetic poles fixed to the hub 28, the plurality of magnetic poles being arranged to be along the circumferential direction and arranged to radially face the plurality of teeth 40b. For example, the disk drive device may comprise twelve magnets mounted on the hub 28 instead of the cylindrical magnet 32.

While the preferred embodiments of the present invention have been described using specific terms, such description is for illustrative purposes only, and it is to be understood that changes and variations may be made without departing from the spirit or scope of the appended claims.

An exemplary method for manufacturing the disk drive device 100 is as follows: the sintered core 40 is manufactured according to the steps of: treating the surfaces of particles of a magnetic powder so that the electric resistivity of the surfaces is higher than that of the inside of the particles; molding the treated magnetic powder into a shape of the sintered core 40; and heat-treating or sintering the molded magnetic powder. The coils 42 are wound to the sintered core 40. The sintered core 40 with the coils 42 is mounted on the base 4. The shaft 26, the hub 28, the flange 30, the cylindrical magnet 32, the bearing unit 12, and the lubricant 48 are assembled together. The assembly is mounted on the base 4.

What is claimed is:

1. A disk drive device, comprising:
   a hub on which a recording disk is to be mounted;
   a base rotatably supporting the hub through a bearing unit;
   a core fixed to the base, the core having a ring portion and a plurality of teeth that extend radially from the ring portion;
   coils wound around the plurality of teeth; and
   a plurality of magnetic poles fixed to the hub, the plurality of magnetic poles being arranged to be along the circumferential direction and arranged to radially face the plurality of teeth, wherein
   at least a majority of the core is a powder-bonding body formed from a magnetic powder, wherein
   at least one of (a) the surfaces of particles of the magnetic powder and (b) the surfaces of the core is insulated, and
   at least one of the plurality of teeth includes:
      a middle portion that extends radially from the ring portion and around which the coil is wound; and
      an end portion being arranged at an opposite side of the middle portion from the ring portion, and wherein
      the core is formed so that the thickness of the ring portion in the radial direction is less than or equal to 40 percent of the width of the middle portion in the circumferential direction.

2. The disk drive device according to claim 1, wherein the distance between the end portion and the hub is substantially equal to the distance between the coil and the hub.

3. The disk drive device according to claim 1, wherein the core is formed so that the height of the ring portion in the direction along the rotational axis is greater than the height of the middle portion in the direction along the rotational axis.

4. The disk drive device according to claim 1, wherein the core is supported by the base at both the side closer to the ring portion and the side closer to the end portion.

5. The disk drive device according to claim 1, wherein the distance between the end portion and the hub is greater than the distance between the end portion and the base.

6. The disk drive device according to claim 1, wherein the core is formed so that the core is asymmetric with respect to a surface perpendicular to the rotational axis, the surface including the center of gravity of the middle portion.

7. The disk drive device according to claim 1, wherein
   the plurality of magnetic poles is formed on a cylindrical magnet that is fixed to the hub, and
   the height of the end portion in the direction along the rotational axis is in the range of 110 percent to 140 percent of the height of the magnet in the direction along the rotational axis.

8. The disk drive device according to claim 1, wherein
   the plurality of magnetic poles are formed on a cylindrical magnet that is fixed to the hub, and
   the hub is made of a magnetic material, and
   the hub includes:
      an outer cylindrical surface that is to meet an inner periphery of the recording disk; and
      an inner cylindrical surface to which an outer periphery of the magnet is fixed, wherein
   the outer cylindrical surface and the inner cylindrical surface are formed separate in the direction along the rotational axis, and
   the diameter of the inner cylindrical surface is greater than the diameter of the outer cylindrical surface.

9. The disk drive device according to claim 1, wherein the magnetic powder is an iron powder the average particle diameter of which is in the range of 0.05 mm to 0.5 mm.

10. The disk drive device according to claim 1, wherein
    the surfaces of particles of the magnetic powder are insulated, and
    the average thickness of the insulation films on the surfaces of particles of the magnetic powder is in the range of 10 nm to 1 μm.

11. A disk drive device, comprising:
    a hub on which a recording disk is to be mounted;
    a base rotatably supporting the hub through a bearing unit;
    a core fixed to the base, the core having a ring portion and a plurality of teeth that extend radially from the ring portion;
    coils wound around the plurality of teeth; and a plurality of magnetic poles fixed to the hub, the plurality of magnetic poles being arranged to be along the circumferential direction and arranged to radially face the plurality of teeth, wherein
at least a majority of the core is a powder-bonding body formed from a magnetic powder, wherein
at least one of (a) the surfaces of particles of the magnetic powder and (b) the surfaces of the core is insulated, and
at least one of the plurality of teeth includes:
  a middle portion that extends radially from the ring portion and around which the coil is wound; and
  an end portion being arranged at an opposite side of the middle portion from the ring portion, and wherein
the distance between the end portion and the hub is greater than the distance between the end portion and the base.

12. The disk drive device according to claim 11, wherein the distance between the end portion and the hub is substantially equal to the distance between the coil and the hub.

13. The disk drive device according to claim 11, wherein the core is formed so that the height of the ring portion in the direction along the rotational axis is greater than the height of the middle portion in the direction along the rotational axis.

14. The disk drive device according to claim 11, wherein the core is supported by the base at both the side closer to the ring portion and the side closer to the end portion.

15. The disk drive device according to claim 11, wherein the core is formed so that the core is asymmetric with respect to a surface perpendicular to the rotational axis, the surface including the center of gravity of the middle portion.

16. The disk drive device according to claim 11, wherein
the plurality of magnetic poles is formed on a cylindrical magnet that is fixed to the hub, and wherein
the height of the end portion in the direction along the rotational axis is in the range of 110 percent to 140 percent of the height of the magnet in the direction along the rotational axis.

17. The disk drive device according to claim 11, wherein
the plurality of magnetic poles are formed on a cylindrical magnet that is fixed to the hub, wherein
the hub is made of a magnetic material, wherein
the hub includes:
  an outer cylindrical surface that is to meet an inner periphery of the recording disk; and
  an inner cylindrical surface to which an outer periphery of the magnet is fixed, wherein
the outer cylindrical surface and the inner cylindrical surface are formed separate in the direction along the rotational axis, and wherein
the diameter of the inner cylindrical surface is greater than the diameter of the outer cylindrical surface.

18. The disk drive device according to claim 11, wherein the magnetic powder is an iron powder the average particle diameter of which is in the range of 0.05 mm to 0.5 mm.

19. The disk drive device according to claim 11, wherein
the surfaces of particles of the magnetic powder are insulated, and
the average thickness of the insulation films on the surfaces of particles of the magnetic powder is in the range of 10 nm to 1 µm.

20. A disk drive device, comprising:
a hub on which a recording disk is to be mounted;
a base rotatably supporting the hub through a bearing unit;
a core fixed to the base, the core having a ring portion and a plurality of teeth that extend radially from the ring portion;
coils wound around the plurality of teeth; and
a plurality of magnetic poles fixed to the hub, the plurality of magnetic poles being arranged to be along the circumferential direction and arranged to radially face the plurality of teeth, wherein
at least a majority of the core is a powder-bonding body formed from a magnetic powder, wherein
at least one of (a) the surfaces of particles of the magnetic powder and (b) the surfaces of the core is insulated, and
at least one of the plurality of teeth includes:
  a middle portion that extends radially from the ring portion and around which the coil is wound; and
  an end portion being arranged at an opposite side of the middle portion from the ring portion, and wherein
the core is formed so that, when compared in the direction along the rotational axis, the height of the end portion is greater than the height of the ring portion, which is greater than the height of the middle portion.

21. The disk drive device according to claim 20, wherein the distance between the end portion and the hub is substantially equal to the distance between the coil and the hub.

22. The disk drive device according to claim 20, wherein the core is formed so that the thickness of the ring portion in the radial direction is less than or equal to 40 percent of the width of the middle portion in the circumferential direction.

23. The disk drive device according to claim 20, wherein the core is supported by the base at both the side closer to the ring portion and the side closer to the end portion.

24. The disk drive device according to claim 20, wherein the distance between the end portion and the hub is greater than the distance between the end portion and the base.

25. The disk drive device according to claim 20, wherein the core is formed so that the core is asymmetric with respect to a surface perpendicular to the rotational axis, the surface including the center of gravity of the middle portion.

26. The disk drive device according to claim 20, wherein
the plurality of magnetic poles is formed on a cylindrical magnet that is fixed to the hub, and wherein
the height of the end portion in the direction along the rotational axis is in the range of 110 percent to 140 percent of the height of the magnet in the direction along the rotational axis.

27. The disk drive device according to claim 20, wherein
the plurality of magnetic poles are formed on a cylindrical magnet that is fixed to the hub, wherein
the hub is made of a magnetic material, wherein
the hub includes:
  an outer cylindrical surface that is to meet an inner periphery of the recording disk; and
  an inner cylindrical surface to which an outer periphery of the magnet is fixed, wherein
the outer cylindrical surface and the inner cylindrical surface are formed separate in the direction along the rotational axis, and wherein
the diameter of the inner cylindrical surface is greater than the diameter of the outer cylindrical surface.

28. The disk drive device according to claim 20, wherein the magnetic powder is an iron powder the average particle diameter of which is in the range of 0.05 mm to 0.5 mm.

29. The disk drive device according to claim 20, wherein
the surfaces of particles of the magnetic powder are insulated, and wherein
the average thickness of the insulation films on the surfaces of particles of the magnetic powder is in the range of 10 nm to 1 µm.

30. A disk drive device, comprising:
a hub on which a recording disk is to be mounted;
a base rotatably supporting the hub through a bearing unit;

a core fixed to the base, the core having a ring portion and a plurality of teeth that extend radially from the ring portion;

coils wound around the plurality of teeth; and a plurality of magnetic poles fixed to the hub, the plurality of magnetic poles being arranged to be along the circumferential direction and arranged to radially face the plurality of teeth, wherein at least a majority of the core is a powder-bonding body formed from a magnetic powder, wherein at least one of (a) the surfaces of particles of the magnetic powder and (b) the surfaces of the core is insulated, and at least one of the plurality of teeth includes:
 a middle portion that extends radially from the ring portion and around which the coil is wound; and
 an end portion being arranged at an opposite side of the middle portion from the ring portion, wherein the plurality of magnetic poles is formed on a cylindrical magnet that is fixed to the hub, and wherein the height of the end portion in the direction along the rotational axis is in the range of 110 percent to 140 percent of the height of the magnet in the direction along the rotational axis.

31. A disk drive device, comprising:

a hub on which a recording disk is to be mounted;

a base rotatably supporting the hub through a bearing unit;

a core fixed to the base, the core having a ring portion and a plurality of teeth that extend radially from the ring portion;

coils wound around the plurality of teeth; and a plurality of magnetic poles fixed to the hub, the plurality of magnetic poles being arranged to be along the circumferential direction and arranged to radially face the plurality of teeth, wherein at least a majority of the core is a powder-bonding body formed from a magnetic powder, wherein at least one of (a) the surfaces of particles of the magnetic powder and (b) the surfaces of the core is insulated, and at least one of the plurality of teeth includes:
 a middle portion that extends radially from the ring portion and around which the coil is wound; and
 an end portion being arranged at an opposite side of the middle portion from the ring portion, wherein the plurality of magnetic poles are formed on a cylindrical magnet that is fixed to the hub, and wherein the hub is made of a magnetic material, and the hub includes:
 an outer cylindrical surface that is to meet an inner periphery of the recording disk; and
 an inner cylindrical surface to which an outer periphery of the magnet is fixed, wherein the outer cylindrical surface and the inner cylindrical surface are formed separate in the direction along the rotational axis, and wherein the diameter of the inner cylindrical surface is greater than the diameter of the outer cylindrical surface.

\* \* \* \* \*